RICHARD L. VERNON
INVENTOR

BY Mason & Graham
ATTORNEYS

Aug. 7, 1962   R. L. VERNON   3,048,340
PORTABLE WASTE FOOD GRINDER
Filed Oct. 5, 1959   2 Sheets-Sheet 2
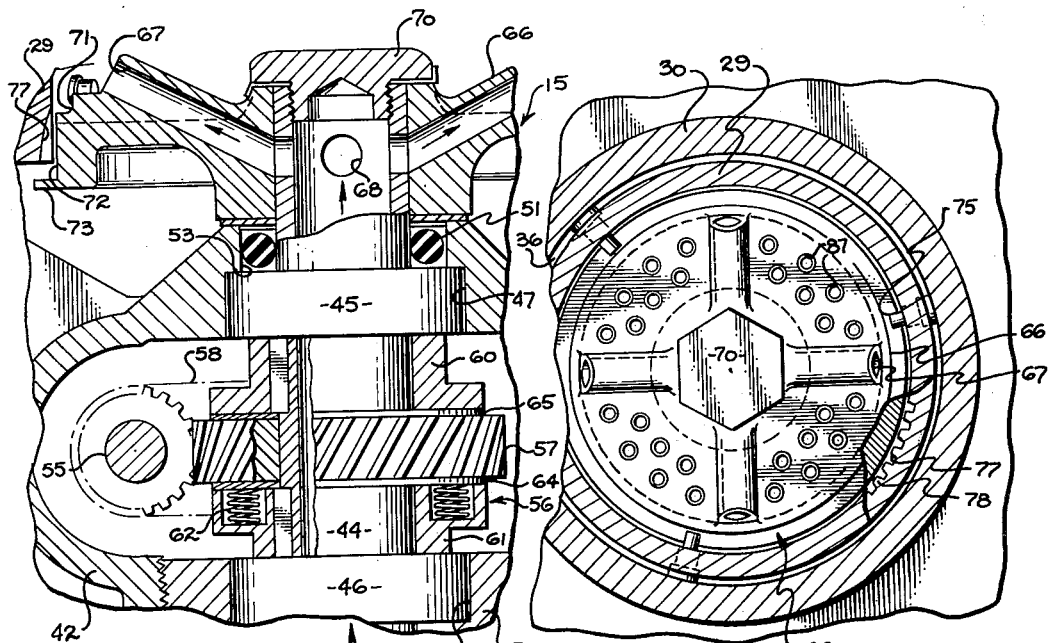
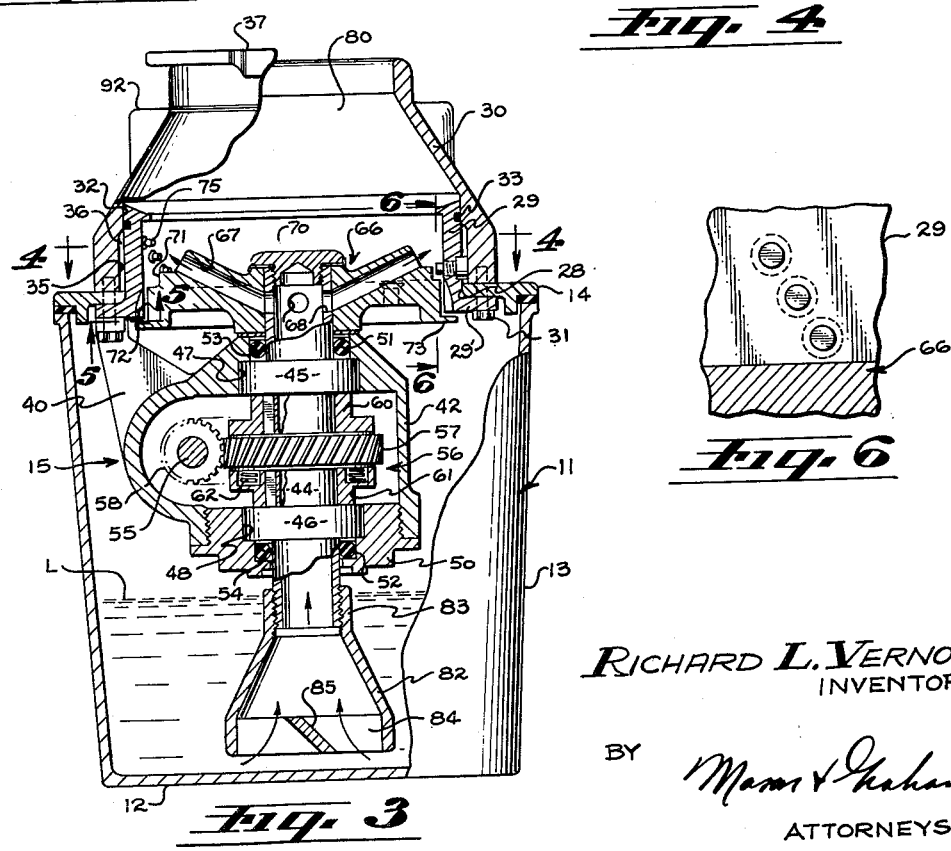
RICHARD L. VERNON
INVENTOR
BY
ATTORNEYS

United States Patent Office 3,048,340
Patented Aug. 7, 1962

3,048,340
PORTABLE WASTE FOOD GRINDER
Richard L. Vernon, 1916 W. Mountain St.,
Glendale 1, Calif.
Filed Oct. 5, 1959, Ser. No. 844,265
3 Claims. (Cl. 241—46)

This invention has to do with devices for disposing of waste food wherein the waste food is ground or shredded in the presence of water to form a slurrry which can be flushed away in the ordinary household plumbing drain pipe of a sink or the like.

An object of the invention is to provide a novel and improved, portable, self-contained waste food grinding and shredding device which is adapted to be completely independent of fixed electric wiring and plumbing.

Another object is to provide a waste food grinder and shredder of novel construction adapted to hold a supply of water and to circulate the water through the grinding and shredding portion of the apparatus and to recirculate the resulting slurry thereby to provide an extremely finely ground slurry which can be readily disposed of through small drain pipes. In this connection it is an object of the invention to provide novel means for circulating water and slurry from the lower portion of the device upwardly through the grinding and shredding device itself into the waste food receiving chamber in the region where grinding and shredding takes place, thereby facilitating movement of the waste food through the unit.

Still another object of the invention is to provide a device wherein the motor is located above the normal level of liquid in the housing and wherein means is provided for propelling a portion of the circulated liquid over the motor housing for the purpose of cooling the motor.

A further object is to provide a novel means of driving the rotary grinder-shredder head to permit of disengagement of the head from the motor in the event of undue overloading of the head.

Still another object is to provide a device of the type indicated which is relatively light in weight and can be readily operated and handled.

These and other objects will be apparent from the drawings and the following description. Referring to the drawings:

FIG. 3 is a sectional elevational view on line 3—3 of FIG. 2;

FIG. 4 is a sectional plan view on line 4—4 of FIG. 3, but on a larger scale;

FIG. 5 is a fragmentary sectional view in the same plane as FIG. 3 but on a larger scale; and FIG. 6 is a fragmentary sectional view on line 6—6 of FIG. 3, but on a larger scale.

Figure 1:
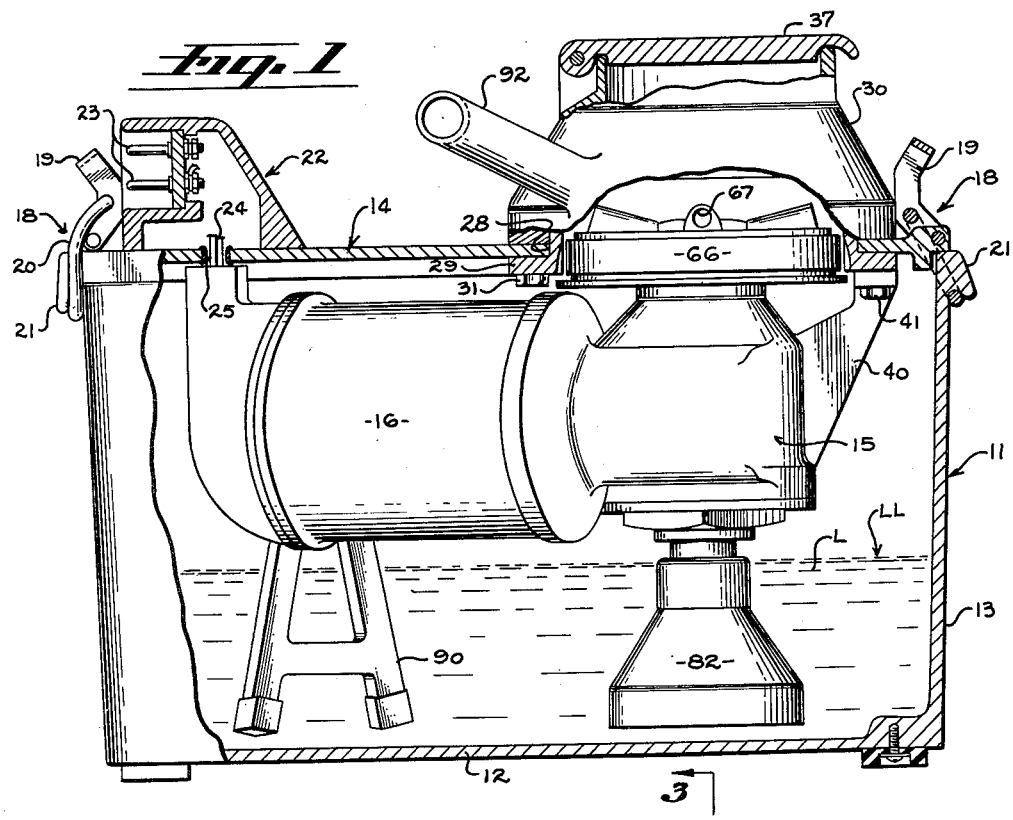
FIG. 1 is an elevational view of a device embodying the invention with the housing broken away in part.
Figure 2:
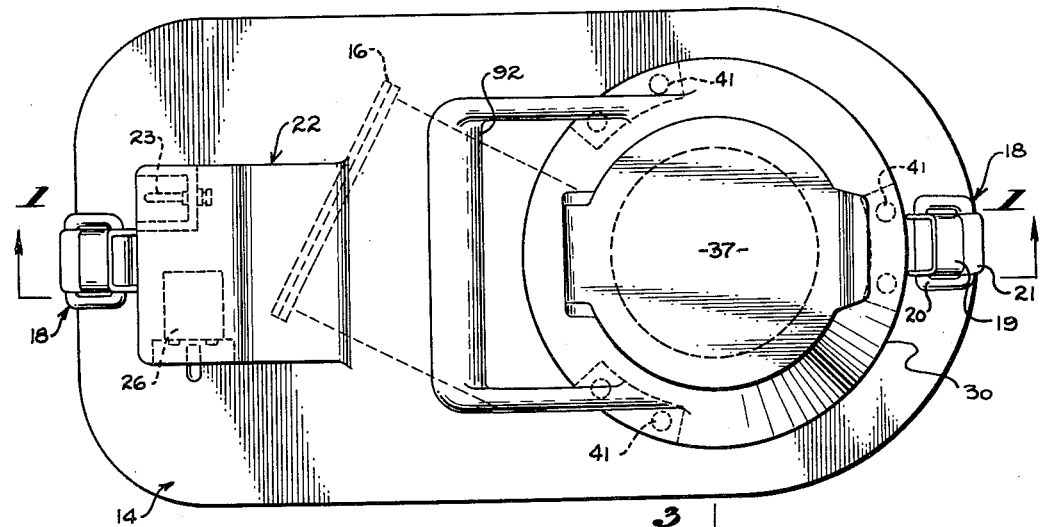
FIG. 2 is a plan view of the device of FIG. 1.

More particularly describing the invention, numeral 11 generally indicates a housing or casing having a bottom wall 12 and an enclosing side wall 13 forming, in effect, an open-topped container which is adapted to hold a supply of liquid L, such as water, for use in grinding and shredding the waste food and ultimately adapted to hold the resulting slurry of waste food particles and water. The housing 11 is provided with a detachably mounted cover plate 14 upon which a shredder-grinder unit 15 and a motor 16 are carried. These latter elements are suspended as a unit from the cover plate which is detachably secured by toggle latches 18 at each end of the device. The latches are conventional in principle, each having a pivoted handle member 19 on the cover and a link 20 pivoted thereto and adapted to hook beneath a lug 21 on the casing.

The cover plate is also provided with an electrical fitting housing 22 containing the terminals 23 by means of which the motor can be connected to a source of electrical current, wires 24 extending from the motor through an opening 25 in the cover to the terminals 23 and to a switch 26.

Referring now more particularly to FIGS. 3 and 4, the cover plate 14 is provided with a circular opening 28 which receives a shredder ring 29. The latter is secured to the cover plate and to an inlet casing or neck 30 by cap screws 31 which pass through a flange 29' of the ring 29 and the cover plate, and thread into member 30. The major portion of the ring 29 is received in casing 30 with the upper end portion closely received in a cylindrical section 32. A seal ring 33 in ring 29 seals the parts. Below section 32 the internal diameter of the neck is enlarged at 35 so that a space 36 is left between it and the outer surface of the shredder ring. The space accommodates the heads of hardened shredder screws or dogs which are threadedly mounted in the ring 29. A pivoted cover 37 is provided at the upper end of the neck.

The motor 16 and the grinder-shredder unit 15 are mounted as a unit on the under side of the cover plate 14 by three bracket portions 40 and screws 41.

The unit 15 includes a casing 42 in which is supported a vertical tubular shaft 44, journaled in ball bearings 45 and 46. The bearing 45 seats in a counterbore 47 of the casing while the bearing 46 seats in a counterbore 48 of an end closure 50 which is threadedly mounted in the lower end of casing 42. Seal rings 51 and 52 are provided beyond the bearings 45 and 46, respectively, in bore sections 53 and 54, respectively.

The shaft 44 is driven by the motor shaft 55 of the motor 16 through the medium of a clutch driven assembly 56. This includes a worm gear 57 which is rotatably mounted upon the shaft 44 and, meshing therewith, a worm 58 fixed to the motor shaft. It will be noted that the motor and its drive shaft 55 extend tangentially with reference to the gear 57. A clutch plate 60 is keyed to shaft 44 above gear 57 and a second clutch plate 61 is keyed to the shaft below gear 57. The lower plate 61 is fitted with a plurality of compression coil springs 62 which forcibly bear against a clutch disc 64 between the springs and gear 57, thereby urging the gear into frictional engagement with an upper disc 65 between plate 60 and gear 57 and establishing a driving connection between the motor and the shaft 44 under conditions of normal loading of the device.

The upper end of the grinder-shredder shaft 44 is provided with a head member 66 which is generally circular and formed to provide a plurality of upwardly inclined radially extending fluid discharge passages 67. These communicate with the interior of shaft 44 through registering openings 68 in the shaft. A cap 70 is threadedly mounted in the outer end of the shaft and serves to secure the head 66.

The head itself is formed with a stepped periphery comprising an upper outer surface 71 of least diameter, intermediate surface 72 of intermediate diameter, and a flange or lip 73 therebelow of greater diameter.

Opposite the peripheral surface 72 of the head 66, the inner surface of the ring 29 is formed to provide a plurality of tapered grooves 77 which define teeth 78. These teeth assist in the comminuting action as the waste food passes downwardly from the waste food receiving chamber 80 within the neck 30 and ring 29 between the ring and the head. The lip or flange 73 provides means for impelling liquid over the casing of the motor 16 thereby serving to cool the motor.

In order to supply water to the head 66, the lower end of shaft 44 is fitted with an impeller or pump attachment comprising a hollow member 82 which has an internally threaded upper end portion 83 mounted on the externally threaded lower end of the shaft 44. Member 82 diverges from the upper portion 83 to its lower end where it is open at 84 between a plurality of radially extending, laterally inclined vanes 85 which serve to propel liquid upwardly through the shaft 44 and out through the passages 67 in the head. The water serves to flush the waste food down between the head 66 and ring 29 and into the container or housing 11. Excess water in the food receiving chamber 80 may drain through a plurality of holes 87 extending through the head.

In the operation of the device, the housing is provided with a supply of water approximately to the liquid level designated LL in FIG. 1. Assuming that the cover plate 14 is fastened in place, chamber 80 within the neck may then be filled with the food to be ground. The lid 37 is closed and the machine placed in operation by connecting it to a suitable source of electric current and manipulating the switch 26. As the shaft 44 is rotation by the motor, water (and subsequently, slurry) is circulated upwardly through shaft 44 to the head and out through passages 67 therein into the interior of the neck serving to provide adequate flow for propelling the food. In this connection it should be noted that the rotating head forcibly propels liquid due to the centrifugal force generated. The liquid drains back into the lower portion of the housing and is recirculated to finely grind the food. After the operation has been completed the cover plate 14 is detached from the housing 11 and lifted off and placed aside while the contents of the container is emptied. The motor housing is shown provided with an A-shaped standard 90 so that the device may be readily stood upright upon the standard and the lower end of the shaft 44. Also the neck is shown provided with a handle 92 to facilitate manipulation of the device.

Although I have shown and described a preferred form of my invention, I contemplate that various changes and modifications can be made therein without departing from the invention, the scope of which is indicated by the following claims.

I claim:

1. A portable waste food shredding and grinding device, comprising a housing forming a container for water and for finely divided particles of waste food produced by the device, a food grinder-shredder unit in said housing extending above the normal operating level of liquid in the housing, a motor operatively connected to said food grinder-shredder unit and having a watertight casing, said motor being disposed above the normal operating liquid level in the housing, and means forming a part of said food grinder-shredder unit for impelling liquid drawn from the lower portion of the housing over said motor casing to cool the motor.

2. In a waste food shredding and grinding device, a housing forming a container for liquid, an upright hollow shaft rotatably mounted in the housing and having an open lower end portion adapted to be submerged in liquid in the container, impeller means at the lower end of the shaft and integral therewith for inducing flow of liquid from the exterior upwardly through the shaft upon rotation of the shaft, a grinding and shredding head fixed to the upper end of said shaft, said head having outlet fluid passages therein in communication with the interior of said hollow shaft, said outlet fluid passages being so disposed as to result in forcibly induced flow therethrough due to centrifugal force generated by rotation of said shaft, casing means providing a food-receiving chamber above said head with said head forming the lower wall of the chamber, and means for rotating the shaft.

3. A portable waste food shredding and grinding device, comprising a housing forming a container for water and for finely divided particles of waste food produced by the device, a motor-driven shredder-grinder unit supported in said housing and cooperating with said housing to define a waste chamber below the unit for said particles of waste food and water, said unit including a rotary head, casing means providing a food-receiving chamber above said head, said housing providing space about said rotary head for passage of waste food particles and liquid from said food-receiving chamber to said waste chamber, and means forming part of said unit for circulating liquid from the waste chamber upwardly to the region of said head and into said food-receiving chamber.

References Cited in the file of this patent
UNITED STATES PATENTS

| | | |
|---|---|---|
| 2,044,564 | Carter | June 16, 1936 |
| 2,629,558 | Miller | Feb. 24, 1953 |
| 2,782,813 | Dudek | Feb. 26, 1957 |
| 2,862,376 | Thelander | Dec. 2, 1958 |
| 2,876,953 | Shepherd | Mar. 10, 1959 |

FOREIGN PATENTS

| | | |
|---|---|---|
| 298,490 | Switzerland | July 16, 1954 |
| 1,057,032 | France | Oct. 23, 1953 |